Sept. 3, 1957  P. T. DOLAN  2,804,840
AUTOMATIC IMMERSION APPARATUS
Filed July 1, 1954
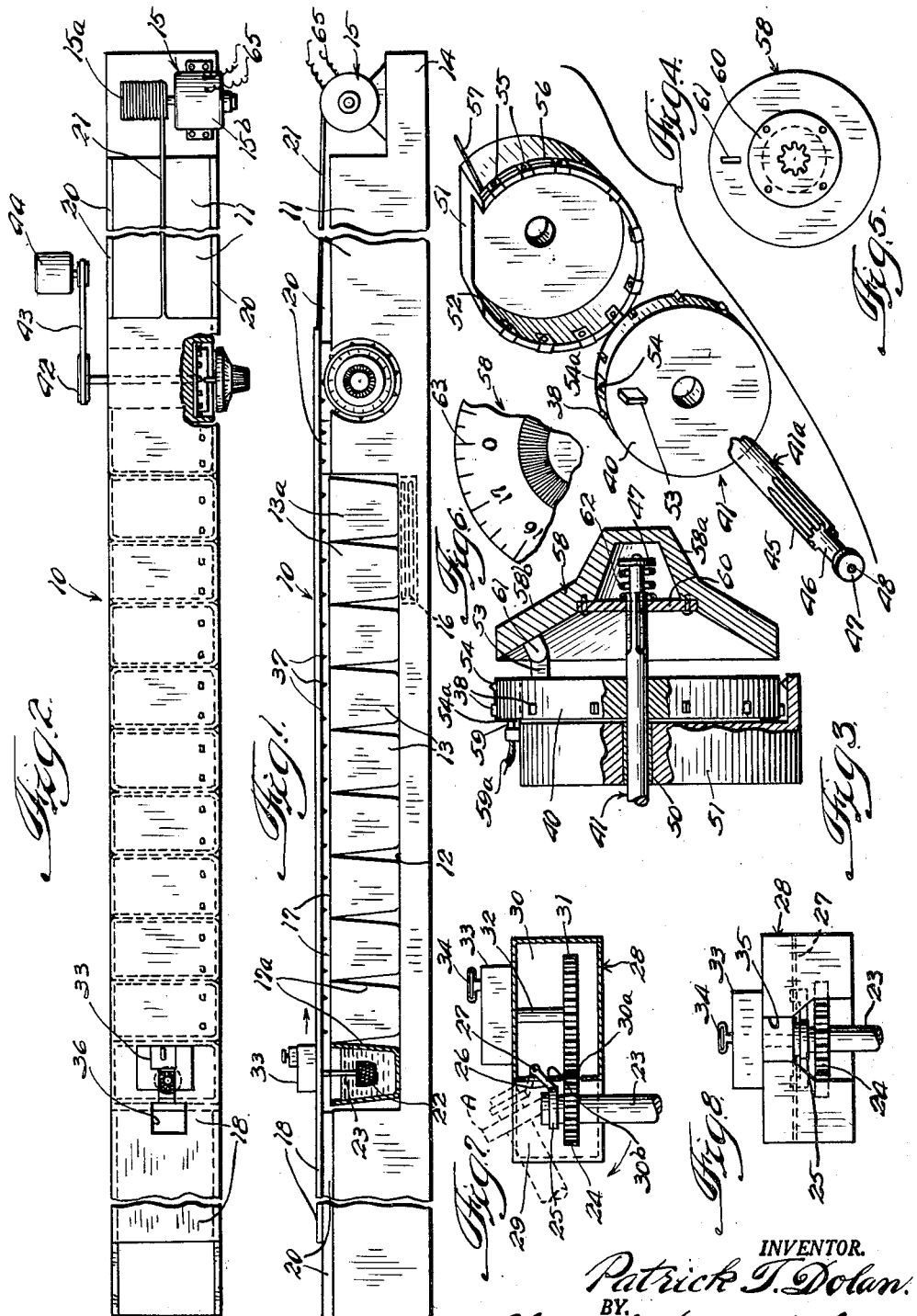
INVENTOR.
Patrick T. Dolan

United States Patent Office

2,804,840
Patented Sept. 3, 1957

2,804,840

AUTOMATIC IMMERSION APPARATUS

Patrick T. Dolan, Aurora, Ill.

Application July 1, 1954, Serial No. 440,711

8 Claims. (Cl. 118—11)

This invention relates to an automatic immersion apparatus and more particularly to an apparatus for use primarily in a field such as biological and medical research.

The apparatus is utilized in preparing specimens of tissue, and the like prior to the latter being subjected to microscopic investigation. It is essential to intelligent study, analysis, or diagnosis of such specimens that they be prepared in such a way as to facilitate handling thereof and so that proper preservation thereof may be maintained for prolonged periods of time. The preparation of such specimens is directed to the problem of replacing the water content of the sample tissue with that of paraffin or some other readily solidifiable material which has the property of not adversely affecting the tissue, and which will enable the prepared specimen to be subsequently subjected to the slicing action of a microtome machine. The latter machine, commonly used in research work of this type, reduces the prepared specimen to a plurality of very thin slices or segments which are suitable for microscopic investigation.

In the past this method of preparing such specimens was, and in many instances still is, practiced manually and normally required prolonged periods of time and careful handling of the specimen by the biologist, pathologist, laboratory technician, or the like practicing the method.

Various machines or apparatus have heretofore been proposed for rendering this operation either completely or semiautomatic. Such machines, however, have been plagued with various serious shortcomings, which have minimized their utility in the field. For example, the design of these machines is either extremely costly and complex, is readily susceptible to getting out of adjustment, or requires expert and skilled personnel to operate and maintain such machines in proper working condition.

Thus, it is one of the objects of this invention to provide an apparatus which effectively overcomes the aforenoted difficulties and shortcomings heretofore associated with prior machines of either the fully or semiautomatic type.

It is a further object of this invention to provide an automatically-operated apparatus which is simple in construction, effective in operation, and inexpensive to manufacture.

Further and additional objects will appear from the description, accompanying drawings, and appended claims.

In accordance with one embodiment of this invention, an automatic immersion apparatus is provided comprising a plurality of receptacles arranged in contiguous side-by-side relation wherein the uppersides thereof are open and disposed in substantially coplanar relation. Spaced above and in overlying relation with respect to the open uppersides of the receptacles is an inflexible cover which is adapted to move relative to said receptacles in a direction parallel to the plane of said open uppersides. Carried by and suspended from the cover is a perforated specimen holder which is adapted to be immersed in the liquid or other media contained within the receptacles. Upon movement of the cover relative to the receptacles, the holder is dragged from one receptacle to the next successive one. The movement of the cover is regulated in accordance with a predetermined time sequence by an adjustable control means which is operatively connected to the cover.

For a more complete understanding of the invention, reference should be made to the drawings wherein:

Figure 1 is a fragmentary side elevational view of the improved apparatus;

Fig. 2 is a fragmentary top plan view of the apparatus shown in Fig. 1;

Fig. 3 is an enlarged fragmentary side elevational view partially in section of the timer control mechanism for the improved apparatus;

Fig. 4 is an enlarged fragmentary perspective view of the timer control mechanism having various parts thereof in exploded relation;

Fig. 5 is a back view of one of the parts incorporated within the timer control mechanism;

Fig. 6 is a fragmentary front view of the part shown in Fig. 5;

Fig. 7 is an enlarged fragmentary view of the actuating mechanism for the perforated specimen holder; and Fig. 8 is a left-hand view of the mechanism as shown in Fig. 7.

Referring now to the drawings and more particularly to Figs. 1 and 2, an improved automatic immersion apparatus is shown for use primarily in preparing a specimen of tissue for subsequent investigation, analysis, or diagnosis. Frequently, after the specimen is removed from the immersion apparatus, it is subjected to the slicing action of a microtome machine, not shown, wherein the prepared specimen is reduced to a plurality of very thin slices or segments. The improved apparatus 10 comprises an elongated frame 11 provided with an elongated well or recess 12 in which is disposed a plurality of receptacles 13, the latter being arranged therein in contiguous side-by-side relation. Protruding from one end of the frame 11 is a platform 14 on which is mounted a motor-driven winch assembly 15, the function of which will be described more fully hereinafter. Formed in the base of the well 12 and adjacent one end thereof is a heating element 16 which is adapted to warm the receptacles 13a resting thereon. These receptacles 13a are normally filled with a molten readily solidifiable material such as paraffin or the like. All of the receptacles 13 and 13a, in this instance, are of like construction having an open upper end 17 and tapered sides 17a converging toward the bottom of the receptacle. The open ends 17 of the receptacles are disposed in substantially coplanar relation. Positioned above and adjacent to the open end of the receptacles and mounted for sliding movement relative to the frame 11 in a plane substantially parallel to the plane of the open ends 17 is an elongated inflexible cover member 18. The length of the cover member 18 is greater than twice the longitudinal length of the well 12 and is supported by pairs of tracks 20 formed on the upperside of frame 11 and adjacent each end of the well 12. The cover member 18 is moved relative to the frame 11 by means of a cable 21 secured at one end of member 18 and wound about a winch 15a, forming a part of the motor-driven winch assembly 15. By reason of the length of member 18, the latter simultaneously covers all of the open ends of the receptacles and thus prevents evaporation of the liquid held by the receptacles and also prevents dirt or other foreign matter finding its way into the receptacles.

Pivotally mounted on cover member 18 and extending downwardly therefrom is a perforated holder or basket in which the specimen to be prepared is placed. The holder 22, as seen more clearly in Fig. 7, has extending upwardly from the top thereof an elongated arm 23 which has keyed to the upper end portion thereof a spur gear 24. Disposed in axially spaced relation above gear 24 is a collar element 25 provided with an angularly extending arm 26, the free end of which is pivotally connected to a shaft 27, disposed within and supported at opposite ends by a hollow casing 28. The casing 28 is mounted on the upperside of the cover member 18 at substantially the longitudinal center thereof. The interior of casing 28 is formed into adjoining compartments 29 and 30 which are interconnected to one another by a plurality of slots 30a and 30b. Disposed within compartment 30 is a spur gear 31 which is adapted to mesh with spur gear 24 when the holder 22 extends downwardly or in a direction normal to the underside of cover member 18 and a portion of the gear 24 protrudes into compartment 30 through slot 30a. Gear 31 is keyed to a depending shaft 32 which, in turn, is rotated by a mechanism disposed within a housing 33 mounted on the upperside of casing 28. The mechanism, in this instance, includes a manually wound spring, not shown, which is provided with an upright key for rewinding the spring. It is to be understood, of course, that any other suitable mechanism, either mechanically or electrically actuated, may be utilized for imparting rotational movement to the spur gear 31. Upon gear 31 being actuated, holder 22 is caused to slowly rotate in one direction, thereby causing the specimen disposed within the holder to become more effectively impregnated with the liquid in which it is immersed.

Compartment 29 is provide with an open side 35 to permit the shaft 23 to pivot in a clockwise direction about pivot shaft 27 to a position A, as shown in dotted lines in Fig. 7, wherein spur gears 24 and 31 are out of meshing relation. A cutout portion 36 is likewise provided in cover member 18 adjacent casing 28 to permit the shaft 23 to pivot a sufficient amount so that the holder 22 can be dragged from one recepacle to the next successive one, upon slidable movement of cover member 18. The sloping sides 17a of the receptacles 13 facilitate dragging of the holder 22. The length of shaft 23 is such that the holder will be completely immersed within the fluid or media contained in the receptacles and yet will not contact the bottom of the latter. The type of fluid or media contained within the receptacles will depend upon the type of specimen being prepared.

Mounted on the underside of cover member 18 and in longitudinally spaced relation with respect to one another are a plurality of trip lugs 37 which are adapted to engage protuberances 38 arranged symmetrically on the periphery of a disc 40, the latter forming a part of a timing control mechanism 41.

The mechanism 41 is adapted to regulate the operating cycle of the motor 15b, which is directly connected to and drives winch 15a, so that the specimen contained within holder 22 will be immersed a proper length of time in each of the various receptacles. The timing mechanism 41 comprises an elongated shaft 41a which is disposed crosswise of the frame 11 and has keyed to one end thereof a pulley 42 which is embraced by a belt 43, the latter being driven by a constant speed unidirectional motor 44 or some other suitable external source of power. Adjacent the opposite end portion of shaft 41a is splined segment 45. The portion 46 of the shaft, between segment 45 and the terminus of the shaft, is reduced in cross section for a purpose to be hereinafter discussed. A retaining washer 47 is secured by means of an axially threaded screw 48 to the terminus of the shaft. The shaft 41a is supported, adjacent the splined segment 45, by a bearing bushing 50 which is mounted within a suitable opening formed in a housing 51. The opposite end of shaft 41a is supported by frame 11.

The housing 51 is mounted in a stationary position on frame 11 and has the exposed side of the housing provided with a protruding substantially annular flange 52, as seen more clearly in Fig. 4. A circular segment of flange 52 has been removed so as to enable a part of the periphery of disc 40 to protrude thereabove. Mounted on shaft 41a, adjacent the splined segment 45 thereof, for rotation independently thereof is disc or wheel 40. The front or exposed face of disc 40, see Fig. 4, is provided with a protruding nub 53 which is spaced radially from shaft 41a. As heretofore mentioned, the periphery of disc 40 is provided with a plurality of symmetrically arranged radially extending protuberances forming a ring 38 which are adapted to be engaged by the trip lugs 37 formed on the underside of cover member 18. Axially spaced from the ring of elements 38 is a single radially extending contact finger 54 formed on the periphery of disc 40. Finger 54 is formed integral with an electrically conductive washed 54a which is mounted on the back side of disc 40. The washer 54a is in continuous electrical con-contact with a brush 59 secured to the upperside of housing 51. The brush 59 is provided with an electrical lead 59a which is electrically connected to one of the leads 65 for winch motor 15b.

Adjustably mounted on the periphery of housing flange 52 is a plurality of contact elements 55 which are adapted to be locked in any relatively spaced relation. The elements 55 are electrically connected to one another by a metallic band 56 which embraces the outside of housing flange 52. Extending from band 56 is a wire lead 57 which is electrically connected to the other lead for winch motor 15b. The single finger 54, formed on the periphery of disc 40, is adapted to make electrical contact with one of the elements 55, formed on housing flange 52, when the disc 40 is rotated through a predetermined sector.

Mounted on the splined end of shaft 41a and in front of disc 40 is a dial piece 58 which is adapted to overlie the end of the shaft and be adjusted axially of said shaft. The piece 58 is provided with a centrally disposed hollow knob portion 58a and a rearwardly inclined annular flange portion 58b. Mounted on the concealed or back side of flange portion 58b is a spider piece 60 which, when the cover 58 is in one position of axial adjustment with respect to the shaft 41a, is adapted to mesh with the splines formed in shaft segment 45 and cause the cover to rotate as a unit with the continuously rotating shaft 41a. The spider piece 60 is spaced rearwardly of knob portion 58a. Mounted in encircling relation with respect to the reduced portion 46 of shaft 41a is a coil spring 62 which is adapted to bear against washer 47 and spider piece 60 and urge the dial piece 58 in an axial direction with respect to the shaft 41a so that the spider piece is in meshing engagement with the splines of segment 45. Formed on the back side of dial piece 58 and spaced radially from shaft 41a is a nub 61 which is adapted to contact the nub 53, formed on disc 40, and cause the latter to rotate as a unit with the dial piece 58 and shaft 41a. The exposed side of flange portion 58a of piece 58 is provided with an annular scale 63 which is calibrated into quarter hour intervals. The scale, in this instance, is adapted for operations lasting eighteen hours or less. The finger 54 formed on the periphery of disc 40 protrudes above the scale 63 so that the operator of the apparatus can, by referring to finger 54 and scale 63, readily ascertain the particular setting of the control mechanism. Furthermore, by referring to scale 63, the operator can adjust contact elements 55 about the periphery of flange 52 so that the time interval between adjacent elements 55 may be varied.

In operating the apparatus, the operator sets the cover piece for the particular length of operation desired and then causes the motors 44 and 15b to be set into operation. Upon the holder 22 becoming immersed in the receptacle, as indicated in Fig. 1, the circuit to winch motor 15b will be interrupted until the dial piece 58 has rotated the disc 40 through a predetermined sector, determined by the relative spacing of the adjacent contact elements, whereupon finger 54 will make electrical contact with one of the elements 55 and cause the circuit to the motor 15b to be closed. When such occurs, motor 15b causes the cover member 18 to slide to the right relative to frame 11, as viewed in Fig. 1, until a protuberance 38 on disc 40 is tripped by a depending lug 37, formed on the underside of cover member 18, whereupon finger 54 is caused to break electrical contact with element 55 and result in stoppage of winch motor 15b. When fingers 37 and 38 contact one another, disc 40 is rotated independently of shaft 41a thereby causing the nubs 53 and 61, formed on disc 40 and cover piece 58, respectively, to be separated from one another. Disc 40 will remain stationary until dial piece 58 has been rotated by shaft 41a through a given sector and the nubs are once again in contact with one another. The dial piece 58 and disc 40 will rotate together until disc 40 is rotated independently by the tripping lug 37 and the cycle of operation once again repeated.

The number of receptacles located within the well 12 may be varied depending upon the type of specimen to be prepared. Once the holder 22 has been removed from the last receptacle 13a by the cover member 18, the winch motor 15b is shut off automatically by a trip device, not shown, carried on the cover member 18 breaking the circuit to motor 44.

To return the cover member 18 to its initial starting position, a clutch, not shown, between winch 15a and motor 15b is released thereby permitting cover member 18 to be moved manually to the left. If desired, power driven means may be utilized to accomplish this result. When returning the cover member 18 to its initial starting position, the holder 22 is pivoted in a clockwise direction so that it will clear the open upper ends 17 of the receptacles.

Thus, it will be seen that an automatic immersion apparatus has been provided which is simple in construction, effective in operation, and inexpensive to produce. The operating cycle of the apparatus may be varied so as to be used in preparing a wide variety of specimens and does not require skilled personnel to operate such apparatus and is inexpensive to maintain.

While a particular embodiment of this invention is shown above, it will be understood, of course, that the invention is not to be limited thereto, since many modifications may be made, and it is contemplated, therefore, by the appended claims to cover any such modifications as fall within the true spirit and scope of this invention.

I claim:

1. An automatic immersion apparatus, comprising a plurality of receptacles having open uppersides, said receptacles being arranged in contiguous side-by-side rectilinear relation wherein the open uppersides thereof are in coplanar relation, an elongated cover disposed in substantially parallel relation with respect to the plane of said open uppersides and simultaneously overlying the uppersides of all of said receptacles, said cover being movable only in a plane parallel to the plane of said open uppersides, a perforated holder carried by and suspended from said cover for slidably moving into and out of successive receptacles upon movement of said cover, and adjustable means operatively connected to said cover for effecting movement thereof in accordance with a predetermined time sequence.

2. An automatic immersion apparatus, comprising a plurality of receptacles having open uppersides, said receptacles being arranged in contiguous side-by-side relation whereby the open uppersides thereof are disposed in substantially coplanar relation, an element disposed adjacent said uppersides and movable relative thereto in accordance with a predetermined time sequence, in a plane substantially parallel to the plane of said open uppersides, and a perforated holder suspended from said element and extending into one of said receptacles and being slidably movable into and out of successive receptacles upon movement of said element relative to said receptacles.

3. An automatic immersion apparatus, comprising a plurality of receptacles having open uppersides, said receptacles being arranged in contiguous side-by-side linear fixed relation whereby the open uppersides thereof are disposed in substantially coplanar relation, a conveyor disposed above said receptacles and adjacent the uppersides thereof and movable relative thereto in a plane substantially parallel to the plane of said receptacle uppersides, an immersible perforated holder suspended from said conveyor for being dragged from a receptacle to the next successive one upon relative movement of said conveyor, and adjustable means operatively connected to said conveyor to effect interrupted relative movement thereof in accordance with a predetermined time sequence.

4. An automatic immersion apparatus, comprising an elongated frame, a plurality of receptacles supported by said frame and arranged thereon in a contiguous side-by-side linear fixed relation whereby the uppersides thereof are open and disposed in substantially coplanar relation, an elongated inflexible cover disposed above said receptacles and in overlying relation with respect to the uppersides of all of said receptacles and supported by said frame for relative movement in a plane substantially parallel to the plane of said uppersides, an immersible perforated holder pivotally suspended from said cover for disposition within a receptacle and adapted to be dragged from one receptacle to the adjoining one upon movement of said cover in one direction, means carried on said cover and cooperating with said holder to effect agitation of the latter independently of said cover, when said holder is in one relative position with respect to a receptacle, and adjustable means mounted on said frame and cooperating with said cover to automatically effect interrupted movement of the latter in accordance with a predetermined time sequence.

5. An automatic immersion apparatus comprising an elongated frame provided with an elongated center well, a plurality of receptacles disposed within said frame well and arranged in contiguous side-by-side linear relation whereby the uppersides of said receptacles are open and disposed in substantially coplanar relation, an elongated inflexible cover supported by the portions of said frame, adjacent opposite ends of said well, for slidable movement relative thereto in a plane substantially parallel to the plane of the open uppersides of said receptacles, said cover being juxtaposed and simultaneously overlying said open uppersides at all times, an immersible holder pivotally suspended from and carried by said cover for being dragged thereby from one receptacle to the next successive one upon movement of said cover, means mounted on said cover and cooperating with said holder for effecting independent agitation of the latter only when said holder is in a predetermined position of pivotal adjustment, power means mounted on said frame and operatively connected to said cover for effecting slidable movement thereof, adjustable control means mounted on said frame and operatively connected to said power means for effecting operation of the latter in accordance with a predetermined time sequence, and trip means mounted in longitudinally spaced relation on said cover for successively contacting said control means to effect interrupted operation of said power means in accordance with said time sequence.

6. An automatic immersion apparatus, comprising a plurality of receptacles arranged in contiguous side-by-side relation and having the uppersides thereof open and disposed in substantially coplanar relation, a cover positioned in juxtaposed relation with respect to said open uppersides and being movable only in a plane substantially parallel to the plane of said upper-sides, an immersible holder pivotally suspended from and carried by said cover and being dragged thereby from one receptacle to the next successive one, adjustable means mounted on said cover and operatively connected to said holder for effecting rotation thereof only when the latter is disposed substantially normal to the direction of travel of said cover, power means operatively connected to said cover to effect movement thereof, adjustable timing means electrically connected to said power means to control the operation of the latter in accordance with a predetermined time sequence, and trip means mounted in spaced relation on said cover for successively contacting said timing means and effecting interrupted operation of said power means in accordance with said predetermined time sequence.

7. An automatic immersion apparatus, comprising a plurality of receptacles arranged in contiguous side-by-side relation, said receptacles having open uppersides disposed in substantially coplanar relation, a cover disposed in juxtaposed relation with respect to and simultaneously overlying the uppersides of all of said receptacles and being slidably movable in a substantially rectilinear direction substantially parallel to the plane of said uppersides, a perforated holder carried by and suspended from a predetermined position on said cover for slidably moving into and out of successive receptacles upon relative movement of said cover, and adjustable means operatively connected to said cover for effecting movement of the latter in accordance with a predetermnied time sequence, said cover having a length sufficient to simultaneously overlie all of said receptacles irrespective of the position of said holder.

8. An automatic immersion apparatus, comprising a plurality of receptacles having open uppersides, said receptacles being arranged in contiguous side-by-side relation wherein the open uppersides thereof are in coplanar relation, a cover disposed in juxtaposed parallel relation with respect to the plane of said uppersides and simultaneously overlying the uppersides of all of said receptacles, said cover and receptacles being relatively movable in a rectilinear direction substantially parallel to the plane of said uppersides during a predetermined time sequence, and a perforated holder carried by and suspended from a predetermined position on said cover for slidably moving into and out of successive receptacles upon relative movement of said cover in one direction, said cover having a length sufficient to simultaneously overlie all of said receptacles irrespective of the position of said holder.

References Cited in the file of this patent

UNITED STATES PATENTS

| | | |
|---|---|---|
| 2,073,576 | Climenhaga | Mar. 9, 1937 |
| 2,341,198 | Weiskopf | Feb. 8, 1944 |